United States Patent [19]

Stwalley et al.

[11] Patent Number: 4,627,066
[45] Date of Patent: Dec. 2, 1986

[54] EXCIMER LASER PUMPED BY DISSOCIATIVE RECOMBINATION

[75] Inventors: William C. Stwalley, Iowa City, Iowa; Mark E. Koch, Dallas, Tex.

[73] Assignee: University of Iowa Research Foundation, Iowa City, Iowa

[21] Appl. No.: 608,285

[22] Filed: May 8, 1984

[51] Int. Cl.$^4$ .............................................. H01S 3/22
[52] U.S. Cl. ...................................... 372/57; 372/74; 372/39
[58] Field of Search ...................... 372/57, 55, 68, 69, 372/70, 89, 73, 74

[56] References Cited

U.S. PATENT DOCUMENTS 4,087,765 5/1978 Edelstein et al. .................... 372/57

OTHER PUBLICATIONS

Bahns et al; "New Alkali Metal Dimer Optically Pumped Lasers"; Proc. of Int. Conf. on Lasers '82.
Rajaei-Rizi et al; "Optically Pumped Ring Laser Oscillation in $^6Li_2$ Molecule"; Appl. Phys. Lett 40(10), 15 May 1982.
Bahns et al; Optically Pumped Ring Laser Oscillation to Vibrational Levels Near Dissociation and to Contin. of $Na_2$"; Appl. Phys Lett 42(4), 15 Feb. 83.
Rajaei-Rizi et al; "New Optically Pumped Alkali Metal Dimer Lasers"; Proc. of Int. Conf. on Lasers '81.

Primary Examiner—Leon Scott, Jr.
Attorney, Agent, or Firm—Beveridge, DeGrandi & Weilacher

[57] ABSTRACT

A preferred embodiment of an excimer laser has a heat pipe oven adapted to raise sodium therein to a temperature of about 800 Kelvin and thereby vaporize the sodium at a pressure of no more than about 0.1 atmosphere, the heat pipe oven having substantially transparent ends. A ring cavity made up of a plurality of mirrors and an adjustable birefringent filter circulates violet light of a desired wavelength through the transparent ends of the heat pipe oven, and a pump laser introduces radiation into the heat pipe oven at an energy high enough to ionize sodium therein to form $Na_3^+$ ions and free electrons. The recombination of $Na_3^+$ ions and free electrons causes the ions to dissociate into free sodium atoms and excited $Na_2$ molecules which, when stimulated by violet light of the desired wavelength, further dissociate into two free sodium atoms and emit additional violet light of the desired wavelength.

22 Claims, 2 Drawing Figures

EXCIMER LASER PUMPED BY DISSOCIATIVE RECOMBINATION

BACKGROUND OF THE INVENTION

The present invention relates to lasers and more particularly provides a new laser mechanism in which the upper lasing level is pumped by means of dissociative recombination.

Dissociative recombination is a phenomenon exhibited by certain molecular ions. Experimental evidence has revealed instances of dissociative recombination, occurring most readily in gas phase substances. Such gas phase substances may have numerous allotropes which can be ionized in many ways, including electrically, optically, and chemically. The ionic allotropes of a substance are not uniformly stable, leading to differences in the populations of the allotropes. For instance, for hydrogen the $H_3^+$ ion is more stable under usual conditions than the $H_2^+$ ion. As a result the numer of $H_3^+$ ions will be greater than $H_2^+$ ions in a given population. Sodium has a similar stable molecular ion, $Na_3^+$. Thus, in an ionized population there will be a predominance in the number of ions of a highly stable species in comparison to the number of ions of the less stable species.

In some cases, when the stable ions recombine with free electrons in the population, the ion dissociates. For example, upon recombination the $Na_3^+$ ion may dissociate into an $Na_2^*$ species and a monatomic Na species. (The superscript asterisk * indicates that the molecule is in an excited electronic state.) The $Na_2^*$ molecule is subject to further dissociation into two, separate monatomic Na entities following the emission of light in the violet wavelength region of the visible spectrum. The violet band of sodium was suggested as a possible laser candidate by F. G. Houtermans, *Helv. Phys. Acta* 33, (1960) 933, and J. P. Woerdman, "Laser-Excited Broad Band Violet Emission From A Sodium Molecule," *Optics Communications* 26, (1978) 216.

An atomic laser based on the dissociative recombination process was proposed in B. N. Smirnov, "A Molecular Ion Gas Laser," *Soviet Physics-Doklady* 13, (1969) 1148; L. Y. Efremenkova et al., "Ultra-Violet Laser Using the Lyman Transition," *Soviet Physics-Doklady* 17, (1972) 336; and A. V. Eletskii, et al., "Dissociative Recombination of Electrons and Molecular Ions," *Sov. Phys. Usp.* 25(1), (1982) 13. Recombination lasers generally were recently reviewed in E. L. Latush et al., "Metal Vapor Recombination Laser Research," *Proc. Int'l. Conf. on Lasers* '81 pp. 1121–1128, STS Press, McLean, Va.

Molecular lasers based on the dissociative recombination process have not previously been proposed.

In addition, the applicants have been involved in laser research for a number of years and have participated in generating the following publications in connection with such research:

A. Rajaei-Rizi et al., "New Optically Pumped Alkali Metal Dimer Lasers," *Proc. Intl. Conf. on Lasers* '81 pp. 447–449 (1981).

J. T. Bahns, et al., "New Alkali Metal Dimer Optically Pumped Lasers," *Proc. Int. Conf. on Lasers* '82 pp. 713–720 (1982).

J. T. Bahns, et al., "Optically Pumped Ring Laser Oscillation to Vibrational Levels Near Dissociation and To the Continuum of $Na_2$," *Applied Physics Letters* 42, (1983) 336–338 (not admitted to be prior art).

Similarly, excimer lasers are known, such as those disclosed in U.S. Pat. No. 4,136,336 to Searles et al. and U.S. Pat. No. 4,249,143 to Eden. See also Ch. K. Rhodes, Editor, *Excimer Lasers* (Springer Verlag, New York 1979) and C. K. Rhodes, H. Egger and H. Pummer, Editors, *Excimer Lasers*-1983 (American Institute of Physics, New York 1983). The foregoing publications and patents are incorporated herein by reference.

Excimer lasers have the feature that a population of molecules in an excited state is formed and the molecules dissociate into atoms or less complex molecules following the emission of light. The coherent emission of such light from many molecules in the population is the laser emission. The emission of the photon is the result of a transition from a particular energy state of the molecule to a particular state of the atoms or less complex molecules. The energy state of the molecule is greater than that of the dissociated products, so during the transition, energy is given off in the form of a photon. The difference in energy determines the energy of the photon, and also its wavelength, in accordance with Planck's Law.

Excimer lasers have two valuable features. First, because the photon is emitted as the constituents of the molecule begin separating from one another, the reverse process, photon absorption, occurs very infrequently. That is, once the constituents are separated, they will not absorb a photon except in the unlikely event that they collide with one another and a photon simultaneously. Thus, unlike atomic lasers, the excimer laser output is almost never significantly reabsorbed by the lasing medium but instead is available for useful purposes. The reabsorption problem is known as "bottlenecking" and is successfully avoided in excimer lasers.

Second, because the upper state is a molecule, it has considerably more energy states than an atom. These arise from the vibrational and rotational quantum states of the molecule, states that an atom does not have. With this greater number of possible upper level energy states, a wide variety of transition energies is possible. In addition, when the constituents of the molecule separate, they can do so with a wide variety of kinetic energies, and thus a wide variety of transition energies. This variety of transition energies allows the excimer laser to be tuned to yield photons having a desired energy corresponding to a specific wavelength, determined by the precise difference in energy between the upper state of the molecule and the lower state of the dissociated products.

A tunable, efficient, high powered laser would be of great benefit in a number of applications. Among these are the pumping of existing dye lasers, photochemistry, photolithography, materials processing, surgery, and analytical fluorescence. However, to date the options available have been limited to tunable dye lasers for wavelengths in the violet band of visible light, which would be especially suitable for the above-mentioned applications. Accordingly, there is a need in the art for such a laser.

SUMMARY OF THE INVENTION

The present invention fulfills this need in the art by providing a method of producing coherent electromagnetic radiation. The electromagnetic radiation is emitted attending an energy level transition from a higher energy level state of a molecule $R_{n+p}$ to a lower energy level including species $R_p$ and $R_n$. The higher energy level $R_{n+p}$ is the product of the dissociative recombination of $R^+_{n+m+p}$ with an electron in which m, n and p are positive integers having a sum in the range of 3 to at least 14, inclusive, but possibly even higher. R is an atom capable of being ionized to form the indicated molecular ions. Promising examples include lithium, sodium, potassium, rubidium, cesium, hydrogen, nitrogen and mercury. More preferably, R is an alkali metal, especially sodium, m is one, n is one and p is one. It is preferred that the method be carried out under certain conditions and that $R^+_{n+m+p}$ be the predominant ionic form under those conditions. (Note that conventional notation is used herein; thus, a subscript indicates the number of atoms of the element indicated by the immediately preceding chemical symbol).

More specifically, coherent electromagnetic radiation is produced by vaporizing atoms of alkali metal in a heating means and introducing into the heating means energy selected to produce polyatomic ionic species of the vapor of the alkali metal. Ions of the polyatomic species of the alkali metal recombine with free electrons in the heating means to cause dissociation of the polyatomic species into allotropes thereof. One of the allotropes is capable of subsequently dissociating into further allotropes and emitting electromagnetic radiation when stimulated by similar radiation. Typically, the partial pressure of the vapor in the heating means does not exceed about 0.1 atmospheres and the temperature is about 800 Kelvin. The ionizing energy may be an emission from a laser. Suitable ionizing lasers include continuous krypton ion lasers, continuous argon ion lasers, pulsed xenon-fluoride excimer lasers, and pulsed, frequency-tripled Neodymium YAG lasers. In one embodiment the ionizing laser emission is introduced to a ring cavity of which the heating means is a portion. The wavelength of the coherent radiation may be tuned by adjusting a birefringent filter which may be introduced into the ring cavity. The heating means may be a heat pipe oven.

Viewed from another standpoint, the present invention provides an excimer laser which includes a vaporous lasing medium having five forms including the species ARX, AR, R, X and A; R, X and A being an atom or a molecular fragment of one or more elements. ARX is ionizable to form ARX+, and ARX+ has the property that upon recombination with an energetic electron it dissociates to form X and AR in an excited state. The excited state of AR may dissociate into A and R and emit electromagnetic radiation of a selected wavelength when stimulated by similar electromagnetic radiation. The laser includes means for ionizing at least a portion of the ARX species of the lasing medium to form ARX+ and means for stimulating AR to emit electromagnetic radiation of the selected wavelength and to dissociate to A and R. In a preferred embodiment A, R and X are all the same element, most preferably an alkali metal; e.g. sodium, and the means for ionizing is a laser. Typically, the lasing medium is made vaporous in a heat pipe oven that has substantially transparent ends. The means for stimulating includes a ring cavity of which the heat pipe oven is a part whereby emitted radiation can be reintroduced through one of the transparent ends to the lasing medium.

More specifically, the invention provides an excimer laser that includes a heat pipe oven having substantially transparent ends, and adapted to raise sodium therein to a temperature of about 800 Kelvin at a pressure of no more than about 0.1 atmosphere and thereby vaporize the sodium. A ring cavity made up of a plurality of mirrors and an adjustable birefringent filter circulate violet light of a desired wavelength through the transparent ends of the heat pipe oven. A pump laser introduces radiation into the heat pipe oven at an energy high enough to ionize sodium therein to form $Na_3^+$ ions and free electrons. The $Na_3^+$ ions and free electrons recombine, causing the ions to dissociate into free sodium atoms and excited $Na_2^*$ molecules which, when stimulated by violet light of the desired wavelength, emit additional violet light of the desired wavelength and dissociate into two free sodium atoms. The emitted light and the stimulating light travel together and continue the process of stimulating further emissions from other excited $Na_2$ molecules in the heat pipe oven. Eventually the light exits the oven and is available for use and part of it is recirculated by the ring cavity to stimulate further emissions.

BRIEF DESCRIPTION OF THE DRAWINGS

The invention will be further understood from the detailed description hereinafter and drawings in which.

DETAILED DESCRIPTION OF A PREFERRED EMBODIMENT

Figure 1:
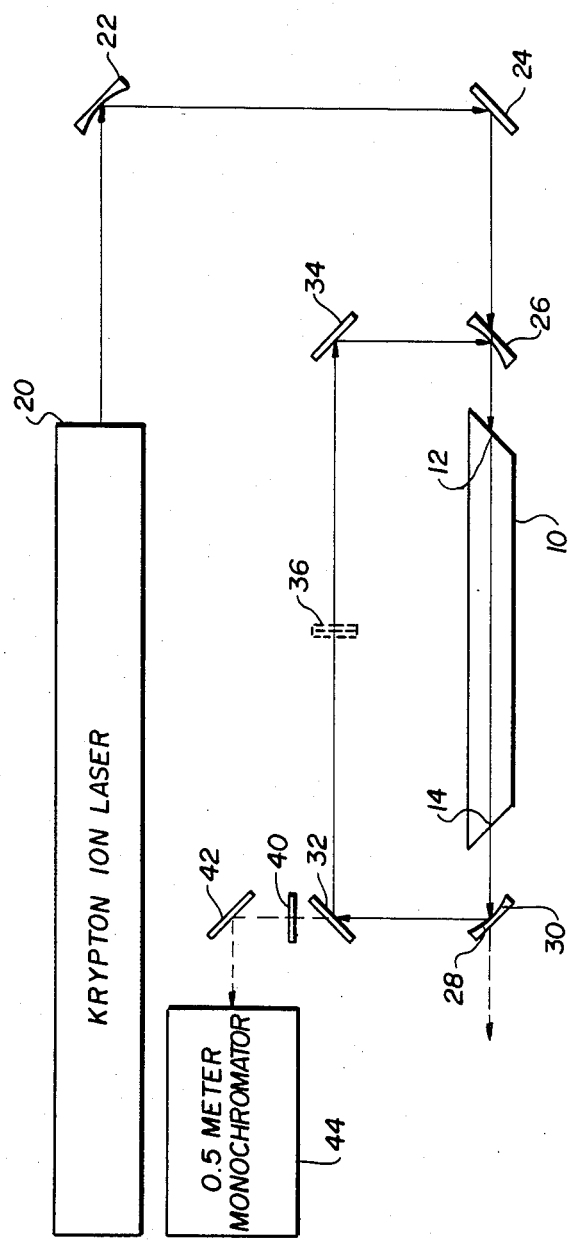
FIG. 1 is a schematic diagram of an apparatus according to the particular embodiment of the invention.

In the preferred embodiment shown in FIG. 1, the desired lasing action takes place in heat pipe oven 10. Contained within heat pipe oven 10 is a quantity of the substance which will be caused to lase. Preferably, that substance is metallic sodium which is vaporized by the heat pipe oven 10 to generate a sodium vapor partial pressure of typically from about 0.001 to about 0.10 atmospheres at a temperature of about 800 Kelvin. Other suitable substances may be substituted for sodium. In particular, the other alkali metals, lithium, potassium, rubidium, and cesium, are presently expected to be suitable. In addition, hydrogen, nitrogen and mercury may be expected to be suitable, as well as other elements. Some compounds may also be suitable. The ends of heat pipe oven 10 are provided with windows 12 and 14 which are substantially transparent at the desired laser wavelength band. Emissions from pump laser 20 are introduced through window 12 and emissions from the sodium heat pipe oven 10 exit window 14 and circulate by means of ring cavity 30 to be reintroduced to the oven through window 12.

The pump laser 20 is preferably a continuous Krypton ion laser providing a 350.7 nm beam, but alternative pump lasers include a continuous Argon ion laser, a pulsed Xenon fluoride excimer laser, or a pulsed, frequency-tripled Neodymium YAG laser. The pump laser beam is reflected off focusing mirror 22 and flat mirror 24. It then passes through curved dichroic mirror 26 and excites intense violet fluorescence in sodium vapor contained in heat pipe oven 10. It does so by ionizing the sodium vapor, leading to the dissociative recombination process and lasing action, which will be further explained hereinafter.

That portion of the pump laser beam which is not absorbed in the heat pipe oven passes through dichroic mirror 28 and leaves the system. Mirrors 26, 28, 32 and 34 together make up the ring cavity 30 and allow laser oscillation when properly aligned. Each of the mirrors is selected to be highly reflective, typically on the order of 99.7%, in the wavelength band of the laser. A birefringent filter 36 is inserted in the ring cavity to provide wavelength tunability to the ring cavity. Filter 36 could be substituted by a prism or grating, with the objective that the filter or its substitute make cavity losses high at all wavelengths except the desired wavelength. The fraction of laser light transmitted by mirror 32 is directed by filter 40 and mirror 42 to 0.5 meter monochromator 44 with which the lasing operation can be monitored.

The pump laser could be replaced by alternate means for ionizing and exciting the vapor in the heat pipe oven. For example, an electrical discharge, a flash lamp or other electrical, optical, or chemical means may be used. Pumping the laser with solar energy is also contemplated.

The mechanism by which the lasing emission is generated will now be discussed. Sodium has a relatively stable triatomic ion, $Na_3^+$. In fact, $Na_3$ has the lowest ionization potential of any $Na_N$ cluster for $N<10$. Under the temperature and pressure conditions given, the ionization of sodium vapor generates a predominant population of $Na_3^+$ ions. As a result of the random motion of the ions and the free electrons which are generated by the ionization process, certain of the ions and the electrons recombine, causing the dissociation of the ions into a monatomic species, Na, and a diatomic species, $Na_2^*$, in which the asterisk indicates an electronically excited state. The diatomic molecules may further dissociate into single atoms, while emitting photons with the wavelength of violet light. It is this violet light which will be used as the laser emission. As will be understood, other vapors will produce emissions at other wavelengths, dependent upon the properties of the vapor.

The sodium vapor has the further advantage of a very weak violet absorption, so that the emitted photons are not immediately reabsorbed. Instead, as an emitted photon passes near another $Na_2^*$ molecule produced by dissociative recombination, it stimulates the emission of another violet photon and leads to the dissociation of the molecule. The repetition of this occurrence in a population of $Na_2^*$ molecules leads to a lasing effect. Moreover, by incorporating the heat pipe oven in a ring cavity, stimulating photons of the proper wavelength can be recirculated to continuously formed $Na_2^*$ molecules in the heat pipe oven, so the operation of the laser is continuous.

It has been found that the use of sodium vapor in the heat pipe oven leads to a substantial gain, so that the power output of the laser is substantial. In particular, it has been found that a gain coefficient, representing the product of the gain and length of the lasing zone, is at a maximum for wavelengths near 435 nm and 452 nm, corresponding to known emissions resulting from an $Na_2^*$ dissociation. This high gain should lead to a high power output, exceeding even existing dye lasers. In addition, calculations show a stimulated emission cross section for $Na_2^*$ of 2.4 $Å^2$ at 452 nm and 3.7 $Å^2$ at 436 nm and a percentage of excited molecules that can lase of 30% at 452 nm and 70% at 436 nm. These indicate that a high laser efficiency can be expected and that lasing should be easy to bring about. In fact, the calculated stimulated emission cross section is comparable to that of the krypton fluoride laser (2 $Å^2$).

Figure 2:
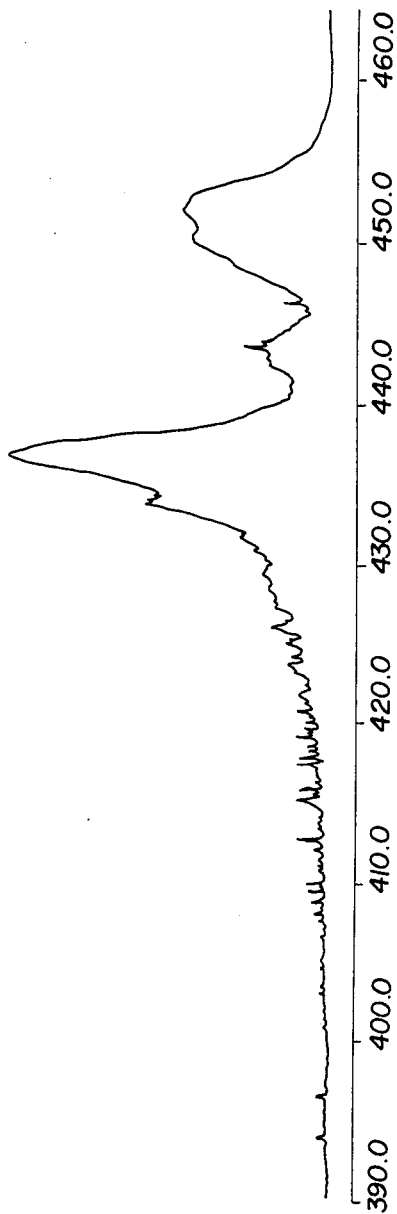
FIG. 2 is a graphical depiction of a fluorescence spectrum of $Na_2$ in the wavelength region 390 to 460 nm.

The fluorescence spectrum of the violet bands of $Na_2$ at an Na partial pressure of 1 torr when excited by electromagnetic radiation with a wavelength of 350.7 nm is shown in FIG. 2. The 350.7 nm radiation is obtained from a krypton ion laser. A high level output is noted at the 436 nm and 452 nm wavelengths. The high output at these wavelengths corresponds to a dissociation of $Na_2^*$. In terms of spectroscopic nomenclature, it is believed that this dissociation is attended by an excimer type transition

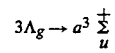

bound-free emission and that the $Na_2^*$ is generated by dissociative recombination of $Na_3^+$. The preferred embodiment takes advantage of the fact that in sodium vapor under typical heat pipe conditions, the predominant ion is $Na_3^+$ (e.g. at a temperature of 800 Kelvin and approximately 6 torr, $P(Na_3^+)/P(Na^+)=570$). Thus, the upper state is produced selectively, by dissociative recombination, following a very nonselective ionization. For this reason, the $Na_2^*$ violet band laser may be producible from $Na_3^+$ ions generated by a wide variety of different pumping schemes, such as optical, electrical, chemical, or solar. In addition, an electron beam or some nuclear mechanism may be useable. Note also that ionization has been converted from being a serious loss to being an integral part of the pumping.

One advantageous feature of the sodium vapor is that formation of any ion leads to formation of the trimer ion $Na_3^+$, and other preferred vapors such as those of the other alkali metals have similarly stable molecular ions.

The present invention fulfills a need in the art for a high powered, tunable laser especially in the violet region of the spectrum. The high power is derived from the efficiency of $Na_3^+$ generation and the high gain achievable in subsequent $Na_2^*$ generation. Tunability is provided by including a means for tuning such as a birefringent filter in a ring cavity, and the violet band wavelength is inherent in the emission attending $Na_2^*$ dissociation. As those of ordinary skill are aware, the literature references noted above may be consulted for further examples of starting materials and information regarding their preparation.

As will be apparent, other species of ions may be used in dissociative recombination and although $Na_3^+$ has been disclosed as exemplary, other ions such as $R_n^+$ where R is an element and $n \geq 3$ may also be used, if suitable. Compounds may also be effective.

As will be apparent from the foregoing descriptions, the present invention is capable of being carried out in a number of different fashions, using different lasing substances, different ionizing mechanisms, and different optical feedback systems. These are intended to be encompassed by the claims appended hereto.

We claim:

1. A method of producing coherent electromagnetic radiation comprising
providing a lasing medium having present at least one of species ARX, AR, R, X or A; R, X and A each being an atom or a molecular fragment said fragment consisting of one or more elements; ARX being ionizable to form ARX+; ARX+ having the property that upon recombination with an energetic electron it dissociates to form X, and AR in an excited state, such that AR in the excited state may emit electromagnetic radiation of a selected wavelength when stimulated by electromagnetic radiation at a wavelength in the range being emitted by AR in an electronically excited state and dissociate into A and R, ionizing at least a portion of ARX species in the lasing medium to form ARX$^+$ and free electrons, recombining ARX$^+$ with said free electrons to form AR in the excited state and X, and stimulating AR in the excited state with said similar electromagnetic radiation to thereby produce coherent electromagnetic radiation and at least two fragments.

2. A method of producing coherent electromagnetic radiation from a lasing medium in which electromagnetic radiation is emited as a result of an energy level transistion from a higher energy level state of a molecule $R_{n+p}$ to a lower energy level including separate species $R_p$ and $R_n$, the molecule $R_{n+p}$ is the product of dissociative recombination of the molecular ion $R^+_{n+m+p}$ with an electron; m, n and p are positive integers having a sum in the range of three to at least 14, inclusive; comprising the following steps ionizing at least a portion of R to form $R^+_{n+m+p}$ and free electrons, wherein R is an atom capable of being ionized to form molecular ions, $R_{n+p}$, $R_p$ and $R_n$;

subjecting $R^+_{n+m+p}$ to dissociative recombination with said free electrons thereby to form $R_{n+p}$ in an electronically excited state, and stimulating $R_{n+p}$ with electromagnetic radiation at a wavelength in the range being emitted by $R_{n+p}$ in said electronically excited state, whereby the emitted electromagnetic radiation stimulates further $R_{n+p} \rightarrow R_n + R_p$ transitions in other $R_{n+p}$ molecules.

3. A method as claimed in claim 2 wherein R is selected from the group consisting of hydrogen, lithium, potassium, sodium, cesium, rubidium, nitrogen and mercury.

4. A method as claimed in claim 2 in which R is an alkali metal.

5. A method as claimed in claim 4 in which n=1 and p=1.

6. A method as claimed in claim 2 in which R is sodium, m=1, n=1 and p=1.

7. A method as claimed in claim 2 in which the method is carried out under controlled conditions and $R^+_{n+m+p}$ is the predominant ionic form of R under the conditions.

8. A method of producing coherent electromagnetic radiation comprising the steps of vaporizing an alkali metal in a heating means, introducing into said heating means energy selected to ionize a polyatomic species of the vapor of said alkali metal, whereby polyatomic species of said alkali metal ionized by said energy recombine with free electrons in said heating means to cause dissociation of said polyatomic species into allotropes thereof, one of said allotropes subsequently emitting electromagnetic radiation when stimulated by similar radiation and dissociating into further allotropes, and introducing said similar radiation to said heating means to stimulate the said allotrope to emit electromagnetic radiation coherent with said similar radiation and dissociate.

9. A method as claimed in claim 8 wherein the partial pressure of said vapor in said heating means does not exceed about 0.1 atmospheres.

10. A method as claimed in claim 8 wherein the temperature in said heating means is about 800 Kelvin.

11. A method as claimed in claim 8 wherein the energy selected to ionize is an emission from a laser selected from the group consisting of (a) a continuous krypton ion laser,
(b) a continuous argon ion laser,
(c) a pulsed xenon fluoride excimer laser, and
(d) a pulsed, frequency-tripled Neodymium YAG laser.

12. A method as claimed in claim 8 wherein the ionizing laser emission is introduced to a ring cavity of which the heating means is a portion.

13. A method as claimed in claim 12 including tuning the wavelength of the coherent radiation by adjusting a birefringent filter within the ring cavity.

14. An excimer laser comprising a vaporous lasing medium having present at least one of species ARX, AR, R, X or A; R, X and A each being one or more elements; ARX being ionizable to form ARX$^+$, ARX$^+$ having the property that upon recombination with an energetic electron it dissociates to form X and AR in an excited state, such that AR in the excited state may emit electromagnetic radiation of a selected wavelength when stimulated by electromagnetic radiation at a wavelength in the range being emitted by AR in an electronically excited state and dissociate into A and R, means for ionizing at least a portion of the ARX species of said lasing medium to form ARX$^+$ and free electrons, means for recombining ARX$^+$ with said free electrons to form AR in an excited state and X, and means for stimulating AR to emit electromagnetic radiation of the selected wavelength and dissociate, said laser producing coherent electromagnetic radiation.

15. A laser as claimed in claim 14 wherein A, R and X are all the same element.

16. A laser as claimed in claim 14 wherein A, R and X are all sodium.

17. A laser as claimed in claim 14 wherein A, R and X are all an alkali metal.

18. A laser as claimed in claim 14 wherein said means for ionizing comprises a laser.

19. A laser as claimed in claim 14 wherein said means for stimulating includes a ring cavity which reintroduces emitted radiation to the lasing medium.

20. A laser as claimed in claim 12 wherein said lasing medium is made vaporous in a heat pipe oven.

21. A laser as claimed in claim 20 wherein said heat pipe oven has substantially transparent ends and wherein said means for stimulating includes a ring cavity of which said heat pipe oven is a part, whereby emitted radiation can be reintroduced through one of said transparent ends to said lasing medium.

22. An excimer laser comprising a heat pipe oven adapted to raise sodium therein to a temperature of about 800 Kelvin and vaporize said sodium at a partial pressure of no more than about 0.1 atmosphere, said heat pipe oven having substantially transparent ends, a ring cavity comprising a plurality of mirrors and an adjustable birefringent filter to circulate violet light of a desired wavelength through said transparent ends of said heat pipe oven and a pump laser arranged to introduce radiation into said heat pipe oven at an energy high enough to ionize sodium therein to form $Na_3^+$ ions and free electrons, whereby the recombination of $Na_3^+$ ions and free electrons will cause the ions to dissociate into free sodium atoms and excited $Na_2$ molecules which, when stimulated by violet light of the desired wavelength, emit additional violet light of the desired wavelength and dissociate into two free sodium atoms.

* * * * *